United States Patent Office.

JAMES P. GODFREY, OF MANCHESTER, NEW HAMPSHIRE.

Letters Patent No. 109,002, dated November 8, 1870.

IMPROVEMENT IN ROOFING COMPOSITIONS.

The Schedule referred to in these Letters Patent and making part of the same.

I, JAMES P. GODFREY, of Manchester, county of Hillsborough and State of New Hampshire, have invented a certain Composition called Granite-State Roofing, to be used on roofs of buildings, flat or of any slope or inclination, to shed rain and prevent the roof from leaking, The nature of the invention consists in mixing common coal-tar, marl-sand, lime, coal-ashes, sawdust, sulphate of zinc, silicate of soda and common salt in certain proportions, to form a composition for roofing.

To prepare the composition, take of these substances the following proportions, viz:

One barrel common coal-tar; five bushels dried marl-sand with one bushel of dry slaked lime, both sifted fine with hair-sieve; one-half bushel finely-sifted coal-ashes; one-half bushel finely-sifted dry sawdust; two and a half pounds sulphate of zinc; dissolve one pound silicate of soda in one quart water, and of this take two ounces; four quarts of salt.

Mix and work thoroughly the same with hoe or spade, and the composition is ready for use.

Prepare the roof by putting on two or more layers of hemp and wool-felt, or any thick paper properly saturated with tar preparation, and substantially fastened to the said roof.

Upon this then spread the composition, with a stiff-hair brush, to the thickness of one-eighth to one-quarter of an inch.

When the composition is thus spread, sprinkle fine sand upon the same to the depth of one-eighth of an inch, or as much as will be absorbed by the composition so spread. The roof is then completed.

I claim as my invention—

The manufacture or preparation of a composition, which I denominate Granite-State roofing, of the ingredients, in the proportion, and for the purposes set forth in this specification.

JAMES P. GODFREY.

Witnesses:
S. D. LORD,
JUSTIN SPEAR.